April 23, 1957  L. A. WEISS  2,789,435
CAPACITIVE LIQUID MEASURING APPARATUS
Filed Oct. 12, 1953  2 Sheets-Sheet 2

INVENTOR.
Leo A. Weiss
BY
Leonard H. King
AGENT

United States Patent Office 2,789,435
Patented Apr. 23, 1957

2,789,435

CAPACITIVE LIQUID MEASURING APPARATUS

Leo A. Weiss, Elmhurst, N. Y., assignor to Avien, Inc., Woodside, N. Y.

Application October 12, 1953, Serial No. 385,487

4 Claims. (Cl. 73—304)

This invention relates to capacitive type liquid measuring apparatus having means for compensating for the dielectric constant of the liquid being measured.

A typical application for this apparatus is the measurement of the quantity of fuel present in fuel tanks of aircraft.

Modern aircraft, particularly jet types, can operate efficiently with a variety of fuels. In practice, these fuels have dielectric constants that differ widely, resulting in substantial errors in measurement when measured by means of conventional capacitive type measuring apparatus.

The pilot of an aircraft is concerned with the total energy available in the form of fuel in the aircraft's tank rather than specifically the total number of gallons. Since the power to be derived from any fuel is based on its available energy, which is in turn based upon weight rather than volume, it is preferred that where the system is used as a fuel gage, the indicator be calibrated in terms of pounds rather than gallons. The system described in this application determines the weight of fuel by sensing its level and applying correction factors based upon a measurement of its dielectric constant.

Recent studies have shown that different samples of the same fuel type and density may have slightly different dielectric constants due to differences in chemical structure. A capacitance type liquid level measuring device may be set to indicate very accurately, gravimetrically, for any one sample of a particular fuel at a given temperature. However, for general use wherein many different samples, even if of the same general type of fuel, are measured over a wide range of temperatures, appreciable errors can result particularly since many materials show a different rate of change of dielectric constant with change in density. Accordingly, a practical fuel gaging system requires the ability to correct for the characteristics of a variety of different types of fuel and for changes in fuel characteristics due to temperature change.

An object of this invention is to provide a capacitive type measuring apparatus which automatically compensates for the dielectric constant of a liquid being measured.

Another object of this invention is to provide an improved sensing capacitor for use in conjunction with a compensated capacity type liquid measuring system.

A particular object of this invention is to provide a capacitive type liquid measuring apparatus of the compensated type capable of accurately measuring at relatively low liquid levels.

For a more complete understanding of the present invention reference should be had to the following detailed description taken in connection with the accompanying drawings which discloses the best mode now contemplated by me for practicing the invention.

One method developed for the compensation of a capacity measuring system for changes in dielectric constant of the liquid involves the use of a secondary sensing capacitor, commonly referred to as a compensating capacitor, immersed in the liquid under measurement, so that the liquid serves as the dielectric medium between its plates. Any change in dielectric constant of the liquid will accordingly cause a change in the capacitance of the compensating capacitor. This compensating capacitor is incorporated into the circuit in such a manner that a corrective factor is introduced in the output signal of the circuit. This capacitor is usually located at the lower portion of the tank so that it is normally completely immersed in liquid. As the liquid level drops and the compensating capacitor becomes uncovered, an error results.

Figure 1:
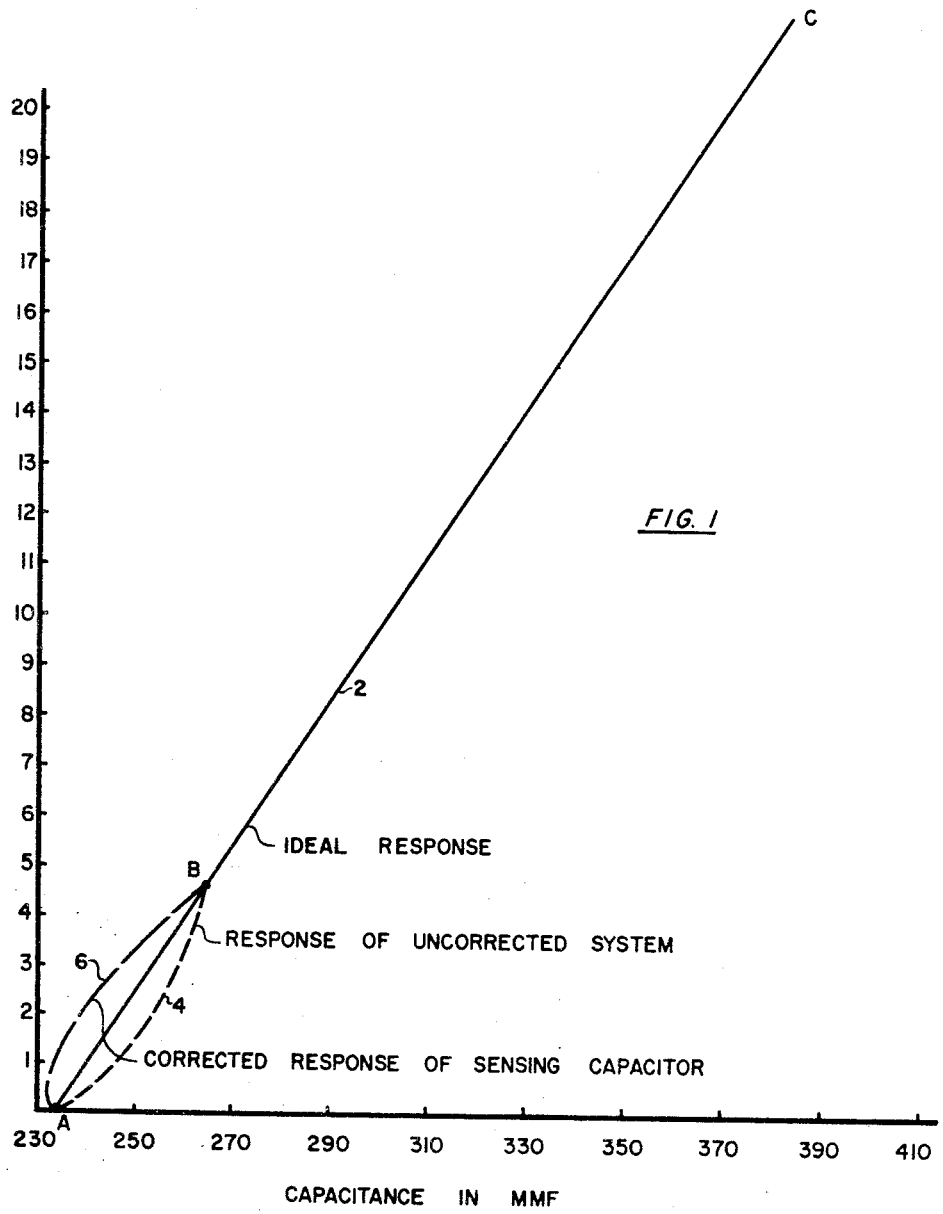
Figure 1 shows graphically the relationship between capacitance of the sensing element of this invention, response of the system and the volume of a typical tank for holding liquid.

Referring to Figure 1 there is shown graphically the relationship between liquid quantity and capacitance of the sensing capacitor. Line 2 shows the desired linear response for the system, while dashed line 4 shows the response of a typical system utilizing such a compensating capacitor, wherein the sensing capacitor has an active capacitance termed the running capacitance at each increment of its length corresponding to the cross-sectional area of the tank at that point. Thus a change in level causes a change in capacitance proportional to the change in volume. Line 2 between points A and B corresponds to the response in the region of liquid level corresponding to the height of the compensating capacitor. For a volume less than that at point B the compensating capacitor begins to uncover. To minimize this error, it has been common practice to use a very small compensating capacitor or to arrange the circuit to short out this capacitor at low liquid levels. It may be appreciated that the use of the small capacitor requires extreme accuracy and close tolerance in manufacturing which is costly and difficult. The alternate procedure of shorting out the compensating capacitor on the other hand defeats the purpose of the compensation means by eliminating it.

This invention provides an improved system wherein the sensing capacitor is designed so that its capacitance changes with change in liquid quantity in accordance with line 6. From the figure it may be seen that the sum of the response of the compensated aparatus and the response of the sensing capacitor will result in a line which is the desired linear system response. Thus for the particular equipment represented by curve 4, the capacitance per unit length of the sensing capacitor or running capacitance need be somewhat less near the bottom of the tank than in the upper region. It should be noted that for some situations the converse may be true.

The improvement of this invention may be applied to a capacitor type liquid quantity measuring apparatus such as is described in a copending application of Franklin Meyer entitled, "Compensated Capacity Gravimetric Measuring Apparatus," Serial Number 381,873, filed September 23, 1953.

The apparatus includes a self-balancing circuit which consists of branch I having a 400 cycle voltage $E_1$ provided by secondary winding 10 of transformer 12 and a sensing capacitor 14 adapted to be inserted in the liquid to be measured so that a change in level of the liquid results in a change in its capacitance. The capacitance will change because the dielectric constant of air is 1.0 while that of a typical hydrocarbon fuel is in the vicinity of 2.0. Accordingly, if the sensing capacitor is completely immersed in fuel the capacitance would be twice that if the tank were empty when the dielectric is air.

A partly filled tank would result in a compound dielectric (partly air and partly fuel) being present in the sensing capacitor which would result in an intermediate value of capacitance.

Sensing capacitor 14 consists of two electrodes, electrode 16 which may be a simple cylinder and electrode 18 which is frequently shaped so that its surface area varies in accordance with the cross-sectional area of the tank in which it is installed. Accordingly, the change in capacitance for a unit change in level is proportional to the quantity of liquid in the tank 20. This is illustrated by the change in the diameter of electrode 18 shown by cylinder 21 which corresponds to the change in tank sectional area shown by step 22 of tank 20. Alternatively, or in addition electrode 16 may be perforated as a means of adjusting the running capacitance of the sensing capacitor 14. The application of this invention is shown by the change in diameter of electrode 18 shown by cylinder 54 surrounding the compensating capacitor electrode 36. This change in capacitance per unit length in the region of the compensating capacitor 34 provides the correction required for compensation of the normal error introduced by the uncovering the compensating capacitor 34.

The change in capacitance unbalances the circuit and, accordingly, a 400 cycle signal will appear across grid resistor 26 which is the input circuit of a voltage responsive means herein shown as amplifier 28. This signal is amplified and applied to a winding 30 of two-phase motor 32. The other phase winding 34 being supplied with current from the primary winding 36 of transformer 12.

In the unbalanced condition, the signal causes the motor to operate potentiometer wiper arm 38 of a potentiometer 40 which is coupled to the shaft of motor 32. Potentiometer 40 is connected across a portion of the secondary winding 10. This change causes a readjustment of the voltage $E_2$ applied to branches II and III. Branch II contains a compensating capacitor 34 which accordingly has applied to it a voltage proportional to the quantity of liquid present. This is in accordance with the principle that the amount of compensation to be applied must be proportional to the quantity of liquid present.

Capacitor 34 consists of two electrodes, one being electrode 18, common to the sensing capacitor, and electrode 36. Electrode 36 is relatively short and normally completely immersed in the liquid. As the level of the liquid drops compensating capacitor 34 is provided with a compound dielectric and therefore sends an improper correction to the amplifier circuit. To compensate for this, this invention provides the correction of the primary sensing capacitor in the region of the tank corresponding to that covered by the compensating capacitor 34. This correction is accomplished by the provision of cylinder 54 which surrounds electrode 36. As has been pointed out earlier other methods of varying the capacitance of the sensing capacitor such as perforation of the outer electrode 16 may be employed.

The motor 32 continues its operation until the circuit is balanced and no signal is applied to the amplifier 28. Operating in tandem with the wiper arm 38 is a pointer 44 which indicates on calibrated dial 46 the liquid level at the rest or balanced condition of the wiper arm 38.

The current supplied by branch II is a function of the applied voltage and the capacitance of the compensating capacitor. If the liquid under measurement has a high dielectric constant, then the current in branch I will be correspondingly higher than if a low dielectric constant liquid is present. Since the same liquid forms the dielectric for the compensating capacitor, it may be appreciated that the current in branch II will also be relatively higher and thus serve to compensate for the higher dielectric material.

Branch III contains a reference capacitor 42 to which is applied the voltage $E_2$ and $E_3$ provided by floating winding 50. The currents of branches II and III are out of phase with that of branch I in the grid resistor 26 which forms the common portion of the three circuits.

In practice it is desired that the currents of branches II and III be precisely in phase and that of branch I exactly 180° out of phase.

It is to be understood that if the capacitors to be immersed in the liquid are proportioned in accordance with the variations of the cross-sectional area of the tank, a change in capacitance for a given change in level would be proportional to the change in quantity rather than strictly the change in level, accordingly references to changes in voltages or capacitance proportional to the change in level are intended to broadly include the special cases where a change in quantity is measured.

Figure 2:
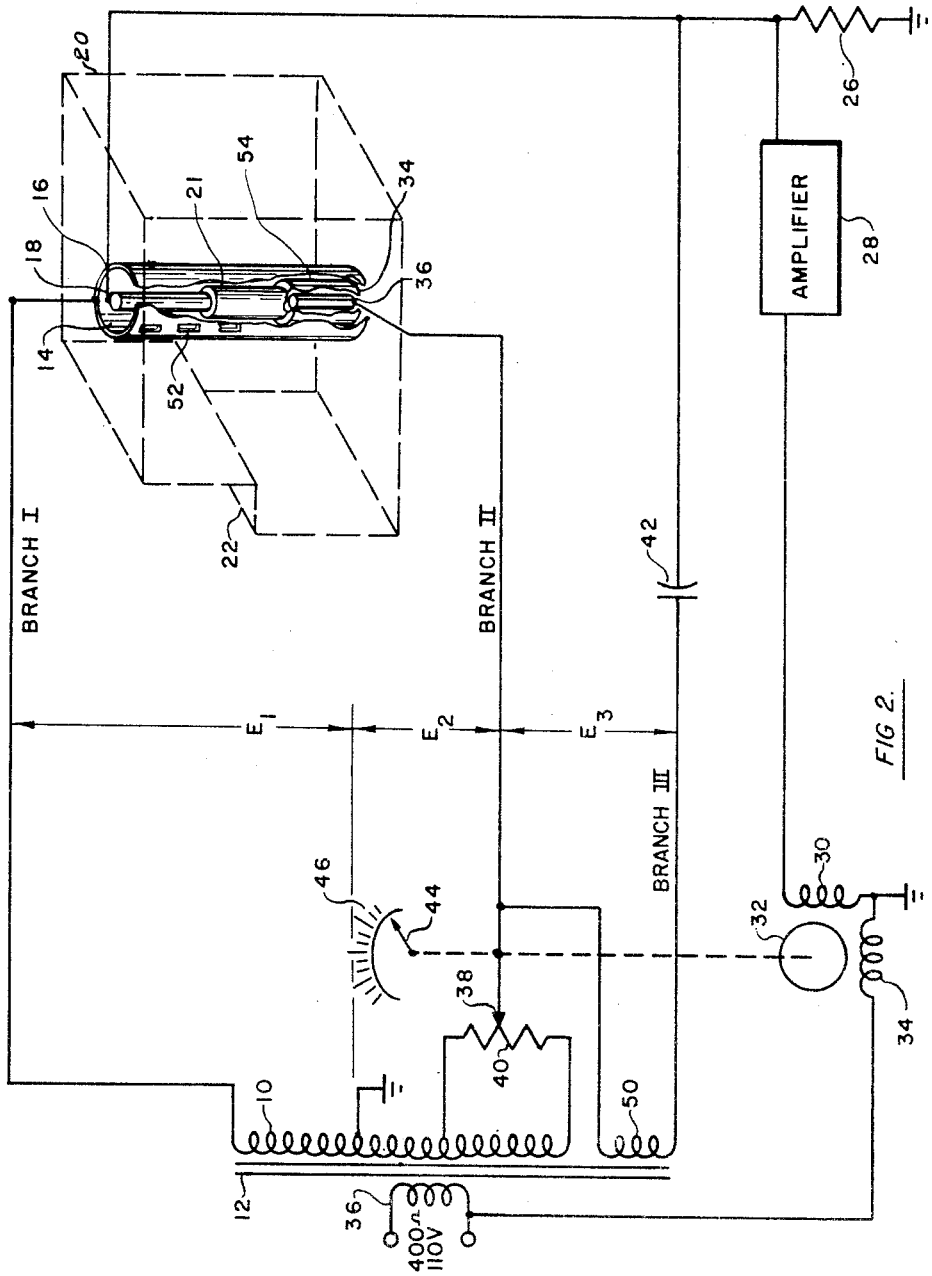
Figure 2 shows schematically and partly pictorially the system of this invention.

The interelectrode capacitance may be adjusted by varying the electrode area. Two methods of making the adjustment are shown in Figure 2. One is the use of punched out areas such as 52 and another is the use of cylindrical electrodes having sections of different diameter such as 21 and 54.

While I have illustrated and described what is presently the preferred embodiment of my invention, it is to be understood that I do not limit myself to the precise construction herein disclosed, and the right is reserved to all changes and modifications coming within the scope of the invention as defined in the appended claims.

Having thus described my invention what I claim is new is:

1. Liquid quantity responsive apparatus comprising in combination: a variable capacitor unit comprising a pair of electrodes having an upper and lower portion adapted to be inserted into a liquid so that the capacitance of said upper portion varies linearly with the quantity of said liquid and the capacitance of said lower portion varies nonlinearly with the quantity of said liquid; a voltage source for energizing said variable capacitor with a voltage of one phase; an amplifier; a first circuit including said source of voltage, said variable capacitor and said amplifier; a two electrode compensating capacitor utilizing the said lower portion of one of said pair of electrodes as one of said two electrodes and a portion of said liquid as the dielectric between said two electrodes; a second circuit including a source of voltage opposite in phase to that of said first circuit voltage source and variable with said liquid quantity, said compensating capacitor, and said amplifier; a third circuit including a reference capacitor, a fixed source of voltage and a source of voltage variable with the quantity of the liquid being measured and opposite in phase to said voltage of said first circuit, and said amplifier; and means operable under the control of said amplifier for varying said second circuit voltage and a portion of said third circuit voltage in proportion to the quantity of the liquid being measured.

2. Gravimetric measuring apparatus comprising in combination: a variable capacitor unit comprising a pair of electrodes having an upper and lower portion adapted to be inserted into a liquid so that the capacitance of said upper portion varies linearly with the quantity of said liquid and the capacitance of said lower portion varies non-linearly with the quantity of said liquid; a reference capacitor; a compensating capacitor positioned in said liquid at the same depth as said variable capacitor lower portion utilizing a portion of said liquid as the dielectric; a voltage source for energizing said variable capacitor with a voltage of one phase; an amplifier; a first circuit including said voltage source, said variable capacitors, and said amplifier; a second circuit including a source of voltage opposite in phase to that of said first circuit voltage source and variable with the quantity of the liquid being measured, said compensating capacitor, and said amplifier; a third circuit including a fixed source of voltage and a source of voltage variable with the quantity of the liquid being measured and opposite in phase to said voltage of said first circuit, said reference capacitor, and said amplifier; and means operable under the control of said amplifier for varying said second voltage and a portion of said third circuit voltage in proportion to the quantity of the liquid being measured, said means being controlled by said amplifier.

3. Measuring apparatus for dielectric fluids comprising; a measuring reference capacitor; a dielectric constant compensation capacitor having spaced electrodes and arranged to be positioned in a container of dielectric fluid so that the fluid exists between its spaced electrodes, the capacitance value of said compensation capacitor being dependent upon the dielectric constant of the fluid and independent of said level of the fluid whenever said compensation capacitor electrodes are completely covered and dependent upon the dielectric constant of the fluid and the level of the fluid whenever the compensation capacitor electrodes are partially uncovered by said fluid; capacitor type measuring means having spaced electrodes arranged to be positioned in said container of dielectric fluid so that fluid enters the space between said electrodes to an extent depending upon the level of fluid in the container; the capacitance value of said measuring means varying substantially linearly with the amount of fluid in the container and the dielectric constant thereof when the level of the fluid covers said compensating capacitor electrodes and non-linearly with the amount of fluid in the container and linearly with the dielectric constant whenever the level of the liquid is insufficient to cover said compensating capacitor electrodes; a source of alternating voltage, means connecting said measuring means to said source of voltage in a manner to produce a signal of a first phase; means connecting said measuring reference capacitor and said compensation capacitor to said source of voltage in a manner to produce a signal of a second phase; signal responsive means, means connecting said signal responsive means to said measuring means and said compensation and reference capacitors to apply to said signal responsive means a signal which is a resultant of said signal of said first phase and said signal of said second phase; and means actuated by said signal responsive means to vary the signal of one of said phases in a direction tending to reduce the resultant signal substantially to zero.

4. Measuring apparatus for dielectric fluids including a capacitor type measuring means having spaced electrodes and being arranged to be positioned in a container of dielectric fluid so that fluid enters the space between said electrodes to an extent depending upon the amount of fluid in the container; a measuring reference capacitor; a dielectric constant compensation capacitor having spaced electrodes and arranged to be positioned so that said fluid may exist between its spaced electrodes; a source of alternating voltage; means connecting said measuring means to said source of voltage in a manner to produce a signal of a first phase; means connecting said measuring reference capacitor and said compensation capacitor to said source of voltage in a manner to produce a signal of a second phase; signal responsive means; indicating means under control of said signal responsive means; means connecting said signal responsive means to said measuring means, and said compensation and reference capacitors to apply to said signal responsive means a signal which is a resultant of said signal of said first phase and said signal of said second phase; and means actuated by said signal responsive means to vary the signal of one of said phases in a direction tending to reduce the resultant signal substantially to zero: wherein the capacitance value of said compensation capacitor is dependent upon the dielectric constant of the fluid and independent of said level of the fluid whenever said compensation capacitor electrodes are completely covered and dependent upon the dielectric constant of the fluid and the level of the fluid whenever the compensation capacitor electrodes are partially uncovered by said fluid and the capacitance value of said measuring means varies substantially linearly with the amount of fluid in the container when the level of the fluid covers said compensating capacitor electrodes and non-linearly with the amount of fluid in the container whenever the level of the fluid is insufficient to cover said compensating capacitor electrodes so that said indicating means provides an indication proportional to the quantity of said fluid in said container.

References Cited in the file of this patent

UNITED STATES PATENTS

| 2,540,658 | De Grirs | Feb. 6, 1951 |
| 2,563,280 | Schafer | Aug. 7, 1951 |
| 2,563,281 | Griffith | Aug. 7, 1951 |
| 2,581,085 | Edelman | Jan. 1, 1952 |
| 2,622,442 | Boisblanc | Dec. 23, 1952 |
| 2,648,982 | Condon | Aug. 18, 1953 |

FOREIGN PATENTS

| 114,980 | Sweden | Sept. 18, 1945 |
| 695,074 | Great Britain | Aug. 5, 1953 |